US008806505B1

(12) United States Patent
Sherry et al.

(10) Patent No.: US 8,806,505 B1
(45) Date of Patent: Aug. 12, 2014

(54) SERVICE AND PROJECT REQUEST PROCESSING WITHIN A BUSINESS ENTERPRISE

(75) Inventors: Ryan Sherry, Wayne, NJ (US); David Palmieri, Marlboro, NJ (US); William Love, Staten Island, NY (US); Donald Curtis, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1539 days.

(21) Appl. No.: 12/164,639

(22) Filed: Jun. 30, 2008

(51) Int. Cl.
*G06F 9/30* (2006.01)
*G06F 9/50* (2006.01)
*G06Q 10/06* (2012.01)

(52) U.S. Cl.
CPC ............ *G06F 9/505* (2013.01); *G06Q 10/0631* (2013.01)
USPC ............................ 718/106; 712/227; 707/100

(58) Field of Classification Search
None
See application file for complete search history.

(56) References Cited

U.S. PATENT DOCUMENTS

| | | | | |
|---|---|---|---|---|
| 5,838,940 A * | 11/1998 | Savkar et al. | ................ | 712/216 |
| 5,867,682 A * | 2/1999 | Witt et al. | ................ | 712/210 |
| 6,249,800 B1 * | 6/2001 | Aman et al. | ................ | 718/105 |
| 7,937,563 B2 * | 5/2011 | Naffziger et al. | ............ | 712/214 |
| 2001/0004756 A1 * | 6/2001 | Inoue | ............. | 712/217 |
| 2002/0059264 A1 * | 5/2002 | Fleming et al. | ............... | 707/100 |
| 2002/0174384 A1 * | 11/2002 | Graichen et al. | ................ | 714/37 |
| 2003/0126001 A1 * | 7/2003 | Northcutt et al. | ................ | 705/8 |
| 2008/0040589 A1 * | 2/2008 | Sakamoto et al. | ............ | 712/229 |

* cited by examiner

*Primary Examiner* — William B Partridge
(74) *Attorney, Agent, or Firm* — Michael A. Springs; Moore & Van Allen PLLC; James C. Edwards (57) ABSTRACT

A system and method for request processing management that includes receiving requests for tasks from a plurality of sources; reviewing the requests by a review group comprising representatives from different functional areas; and identifying at least one functional area for each request for handling the associated request. The requests for tasks from the plurality of sources are received at a single entry point.

11 Claims, 5 Drawing Sheets

SERVICE AND PROJECT REQUEST PROCESSING WITHIN A BUSINESS ENTERPRISE

BACKGROUND OF THE INVENTION

The present invention is related to request processing, and more specifically to a request processing management system.

Many organizations receive requests from clients or customers for a certain project or service to be performed. The organization, which may be a company or other entity, may satisfy these requests by assigning the requests to one or more appropriate functional areas to handle. These functional areas have the appropriate resources for performing and completing tasks associated with a request. Currently, requests for work go directly from a requestor initiating the request to the resources capable of performing tasks associated with the request. Thus, there is no way to track the tasks being performed, manage the resources, or provide any insight to any issues or roadblocks for the projects or services related to the requests. Further problems also exist where no one in any of the functional areas knows what other functional areas are doing, there is no visibility into people's book of work, some resources or people may be over utilized or under utilized, there is no tracking of costs performed, and there is no way to prioritize tasks. This results in requests being processed inefficiently and with little organized management.

BRIEF SUMMARY OF THE INVENTION

According to one aspect of the present invention, a method for request processing management includes receiving requests for tasks from a plurality of sources, reviewing the requests by a review group comprising representatives from different functional areas, and identifying at least one functional area for each request for handling the associated request.

According to another aspect of the present invention, a system for request processing management includes a network, a plurality of first workstations, the first workstations being configured to create and send a request for a task across the network, a server, the server configured to receive the request for the task, and a plurality of second workstations, the plurality of second workstations being configured to access the request for the task, allow review of the request for the task, and allow assignment of resources for the task.

According to a further aspect of the present invention is included an apparatus comprising a storage medium with instructions stored therein, the instructions when executed causing a processing device to perform receiving requests for tasks from a plurality of sources, reviewing the requests by a review group comprising representatives from different functional areas, and identifying at least one functional area for each request for handling the associated request.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device.

Computer program code for carrying out operations of the present invention may be written in an object oriented, scripted or unscripted programming language such as Java™, Perl™, Smalltalk™, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, all work requests come through a single entry point (i.e., single front door) to an enterprise allowing the work to be routed to resource managers for assignment and tracked accordingly. Embodiments according to the present invention provide tracking and monitoring of how long a project or service may take to complete therefore making better and more consistent project estimations as well as providing transparency into the detail of a project (i.e., who is working on it, what are the delivery dates, etc.) to the customer/client (i.e., requestor of the work). Embodiments according to the present invention increase visibility and clarity into an enterprise's book of work to enable accurate and timely resource assignments provide better control and prioritization of work, and to increase accountability and ownership within the enterprise.

Moreover, embodiments according to the present invention provide a number of integrated capabilities such as: a single entry point for receiving project requests and service requests; a resource assignment process that requests and assigns resources; flexibility that dynamically accounts for new types of projects, organizational shifts, and continued strategy development; service requests queuing that route directly to fulfillment teams with status notifications going back to the requestors; demand management and capacity planning tools integrated to handle active and forecasted projects, work and resource estimations, financial data reporting, resource planning tools, and project work estimation tools; automated status report generation of a project or group of projects by team; hierarchical drill down of projects from a top level down to the resource level; team management tools and report summaries; customer-view of projects giving transparency to the customer regarding status, timelines, and resources assigned; generic service request tool capable of handling any type of service request with little customization required to generate code; extended attributes for service requests that allows for capturing specific data elements for each type of request; automated dashboard generation (e.g., in a presentation application, such as PowerPoint™) that pulls data from a SQL server database that uses templates for customizable dashboards, that may be customized by any of many different parameters such as, for example, line of business, group, team, resource, etc.

Figure 1:
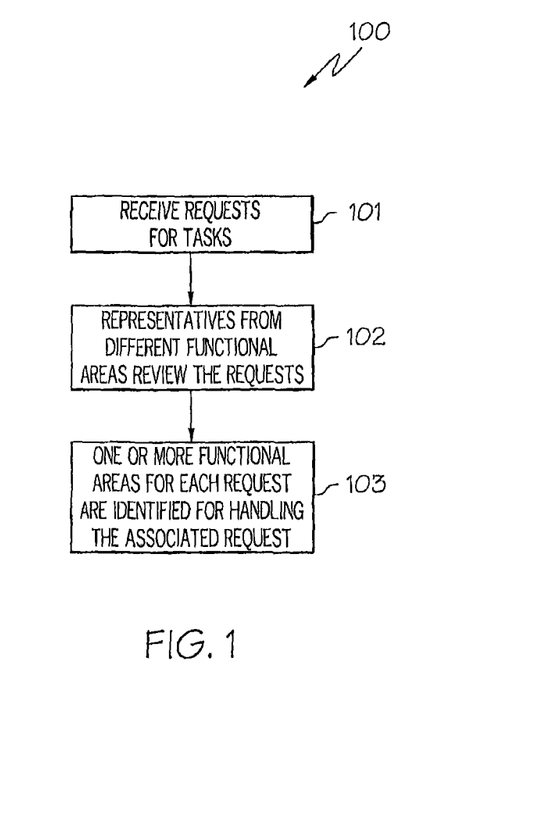
FIG. 1 is a process for request processing management according to an example embodiment of the present invention.

FIG. 1 shows a process for request processing management according to an example embodiment of the present invention. In the process 100, in block 101, requests may be received for tasks. The request may be a project request, a service request, etc. The request is satisfied by completing tasks or work associated with the requested project or the requested service. In block 102, representatives from different functional areas may review the requests. The representatives may attend a meeting to review the request. The meeting may be held at a physical location where representatives physically attend, or may be held online at a particular time where representatives may be located in various locations and access a virtual meeting room over a network. Further, representatives may view the requests at their convenience and provide their comments that are all collected and stored in a database for review at any time by all representatives. Votes submitted by each representative, stored, and tallied to make final decisions regarding the disposition and assignment for handling of each request. In block 103, one or more functional areas for each request may be identified for handling the associated request. Each functional area may have resources that may be needed for performing work or tasks associated with the request. Therefore, if resources exist in multiple functional areas, various functional areas will be identified for handling the associated request.

A service request may be, for example, a request for a user id to be added to a database, execute a data dump for a database or table, add a queue for something, or any request that may be simple and/or may be completed in a short amount of time (e.g., one day) for the requestor. Service requests may include or involve only one specific product or functional group within an organization. A project request may include, for example, work efforts that may be take a much longer time or more effort to complete, e.g., forty hours or more. Project requests may include or involve two or more product or functional groups within an organization.

Figure 2:
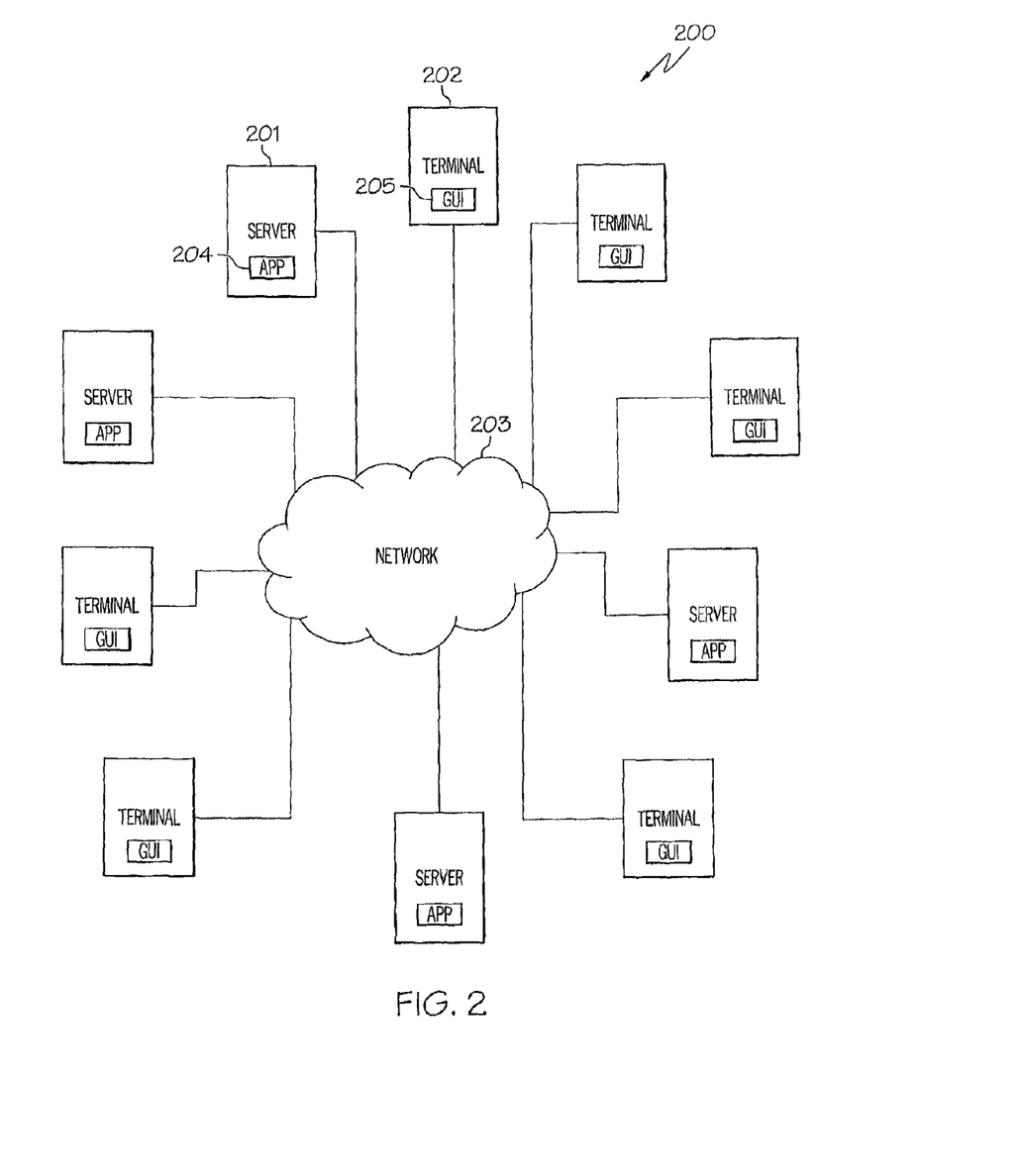
FIG. 2 is a diagram of a system for request processing management according to an example embodiment of the present invention.

FIG. 2 shows a diagram of a system for request processing management according to an example embodiment of the present invention. The system 200 may include one or more servers 201, one or more workstations 202, all interconnected to a network 203. The network 203 may be any type of network such as, for example, the Internet. The one or more servers 201 may include an application 204 that performs request processing management. The application may receive requests, identify a task type associated with the request, route the task to an appropriate queue based on the task type, retrieve information regarding the status, resources, and other details related to the request and associated task(s) performance from a database and generate dashboards and/or desired reports. The application may use stored templates or manually created templates to generate a dashboard or a report. The one or more workstations 202 may include a graphical user interface 205 that allows a user at a first workstation of the one or more workstations 202 to submit requests to the one or more servers 201. Further, a second workstation of the one or more workstations 202 may be used by one or more reviewers to access the server 201 to review each request, provide comments on the request and/or identify handling of each request by one or more functional areas. Moreover, an initiator of the request using the first workstation of the one or more workstations 202 may also access the server 201 to view status of their request, which may be shown on a dashboard or in a report.

Figure 3:
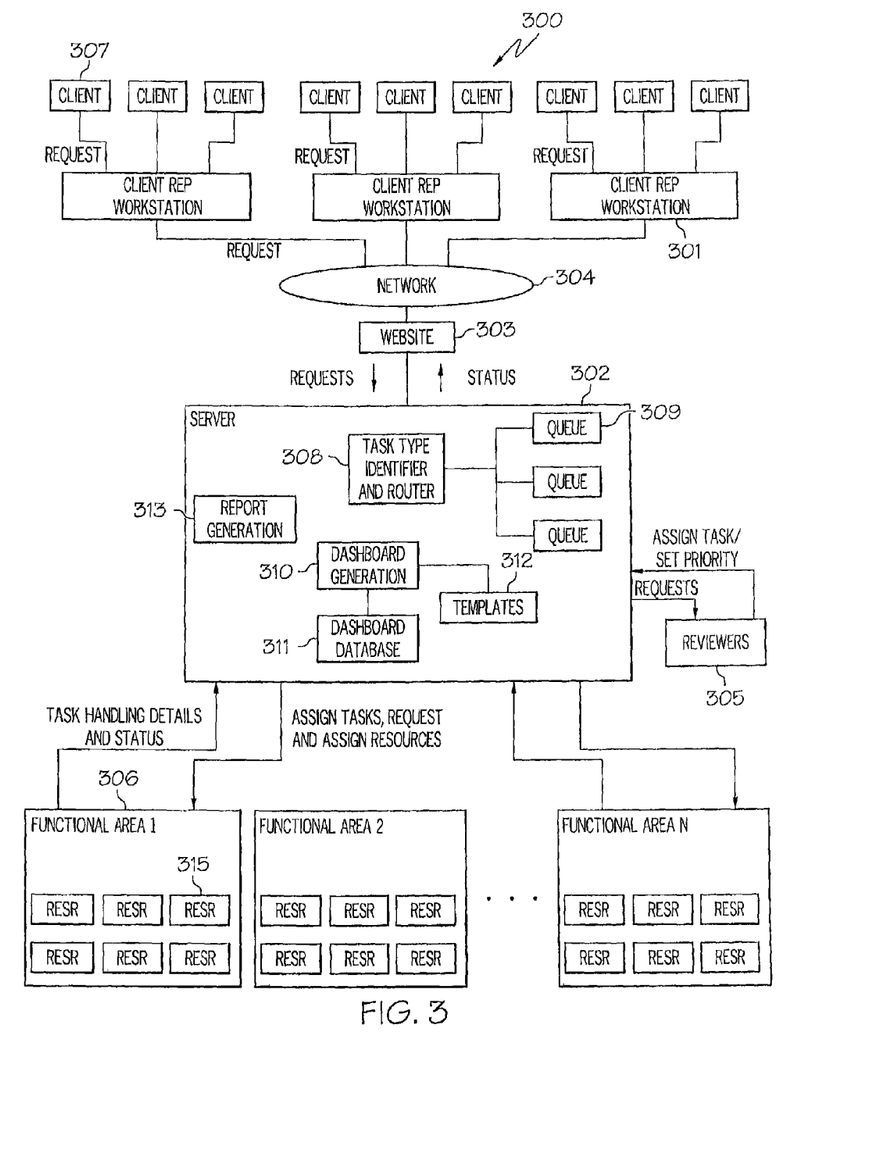
FIG. 3 is a diagram of a system for request process management according to another example embodiment of the present invention.

FIG. 3 shows a diagram of a system for request process management according to another example embodiment of the present invention. The system 300 may include a network 304, one or more workstations 301, which may be used by a client representative to submit requests, and a server 302 that may host a website 303 that may be interconnected to the one or more workstations 301 via the network 304. The server 302 may also be accessible by a plurality of reviewers 305 either directly or through the network 304. Further, the server 302 may assign tasks, and request and assign resources to one or more functional areas 306. The one or more functional areas 306 may provide the server with task handling details and status.

Each client representative may receive requests from various clients 307 serviced by the client representative. A client representative may use a workstation 301 to forward these requests to the website 303 and server 302. Further, requests may be submitted manually, e.g., in paper form. According to embodiments of the present invention, all requests may be received at a single website 303 at a server 302 (i.e. single front door). This provides for efficient processing of requests as well as tracking status on the performance of handling these requests. The website 303 may also be hosted by a server other that the server 302 and the requests transferred from the server hosting the website 303 to the server 302. The server 302 may include a task type identifier and router 308 that may receive each request and identify tasks associated with each request by a task type. The task type identifier and router 308 may then route the request to an appropriate task queue 309 based on the task type identified for the request. Information regarding each request may be retrieved from the task queues 309 when need, e.g., to be reviewed by the reviewers. The server 302 may also include a dashboard generation function that may use templates 312 to format data and information from a database 311 related to the various requests, status handling of the requests, resources assigned to the request, tasks associated with the requests, etc. The server 302 may also include a report generation function 313 that may generate various types of reports associated with the requests, tasks, status, etc. A client representative using one of the workstations 301 may access and review a dashboard generated on the server 302 and/or different reports that may be generated related to the requests that the client representative has submitted. This provides for efficient processing of requests as well as easy tracking of status on the performance and handling these requests.

Once requests have been received manually or via the website 303, a panel of reviewers 305 may access the requests and review the requests. The reviewers may include representatives from all or most functional areas of the enterprise or organization. The reviews may review the requests at a meeting in a room or at a meeting online or may review the requests online at their convenience. The reviewers 305 may then agree on how to assign tasks, associated with the request, to one or more appropriate functional areas 306. Further, the reviewers 305 may set priorities on the various tasks to be performed. Although one server 302 is shown in this embodiment, multiple servers may exist in the system and be within the scope of the present invention. The reviewers 305 may also assign one or more resources 315 from one or more of the functional areas 306 to handle performance of tasks associated with a request.

Each functional area 306 may have one or more resources 315 that may be used in the performance of tasks associated with a request. Functional areas 306 may be any type of functional area that exists in an enterprise, company or organization such as, for example, product management, product operations, product design, capacity planning, service management, client support, facilities, technical support, program office, engineering, accounting, software development, etc. The plurality of resources 315 may comprise people, hardware, tools, software, or a combination thereof. According to some embodiments of the present invention, the reviewers 305 and tasks performed by the server 302 may be managed by a program office of the enterprise.

Once a task associated with a request has been completed, the completion status may be sent to the server 302 and stored in a database 311. Further, dashboards and/or reports may be updated accordingly. In addition, a completion status may be sent to the appropriate client representative at the workstation 301 that submitted the request. During all stages from request reception to task completion and status reporting, information regarding each request and associated processing of the request may be sent to the database and stored to update the database. The stored information may be used to generate dashboards and/or reports, thus providing real time status and information regarding all requests and associated processing, resources, project leads, tasks, functional areas handling the request, etc.

Figure 4:
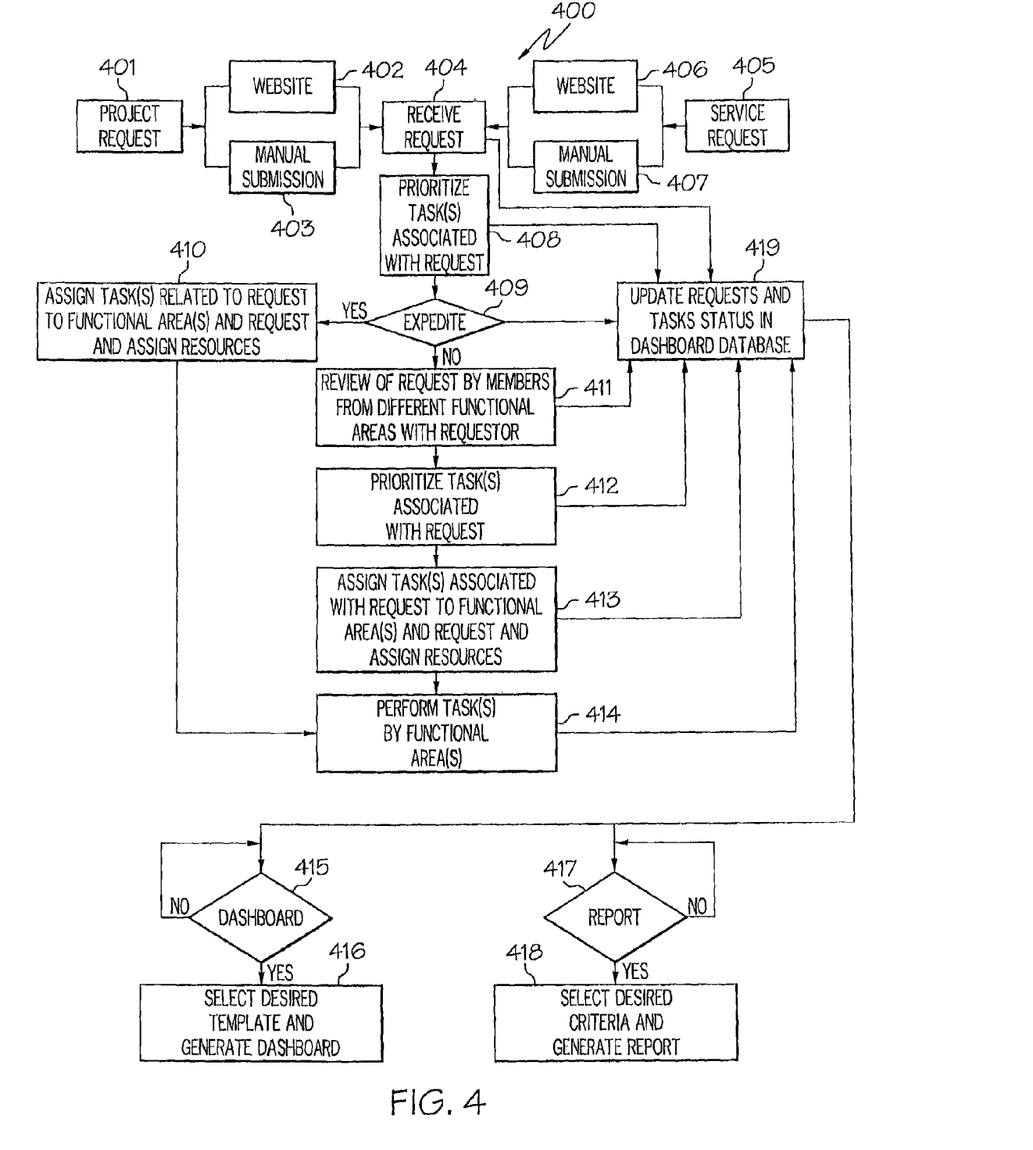
FIG. 4 is a flowchart of a process for request processing according to another example embodiment of the present invention.

FIG. 4 shows a flowchart of a process for request processing according to another example embodiment of the present invention. In the process 400, in block 401, a project request may be generated and then submitted, in block 402 through a website, or in block 403 may be submitted manually. In block 404, the request may be received. Similarly, in block 405 a service request may be generated and submitted, in block 406 via a website, or in block 407 submitted manually. In block 404, the service request may then be received at a server. In block 408, one or more tasks associated with each request may be prioritized. For example, if a request may appear to require a single functional area for handling the request may be expedited to an appropriate functional area or product manager. Further, if, for example, the request comes from a high priority requestor the request may be expedited to an appropriate functional area or product manager.

In block 409, it may be decided whether tasks associated with a request are to be expedited and if so, the one or more tasks related to a request may be assigned to appropriate one or more functional areas and resources requested and assigned. Then in block 414, the one or more tasks may be performed by the one or more functional areas. If the tasks are not to be expedited, then in block 411 the request may be reviewed by members from different functional areas along with the requestor. In block 412, the one or more tasks associated with the request may be prioritized. In block 413, the one or more tasks associated with a request may then be assigned to one or more functional areas and resources requested and assigned for performance of the tasks. In block 414, the one or more tasks may then be performed by the one or more functional areas.

Throughout the various activities involved in receiving a request, processing the request, and completing tasks associated with a request, in block 419, request and task status information may be continually sent to a database. The information may be sent to the database to keep the database updated with the latest status regarding each request. For example, once a request is received, this information may be stored in the database, once a task is prioritized, this information may be stored in the database, and if the one or more tasks are expedited, the database may be updated with this information. Further, if a request is under review, the results of the review from the different functional areas, prioritizations, assignments of tasks and resources to functional areas, and completion status may all be sent and stored in the database to keep the database updated with current information regarding each received request.

Moreover, in block 415 it may be determined if a dashboard is to be created. The dashboard may display various status information related to multiple requests or a single request. If a dashboard is to be created, in block 416 a desired template or desired information to be displayed on the dashboard may be selected and a dashboard generated and displayed. Further, in block 417 it may be determined if a report is to be generated, and if so, in block 418 desired criteria to be included in the report may be selected and an appropriate report generated. A report may be generated at the initiation of one of the members of the functional areas, an initiator of the request or any other person or entity.

Figure 5:
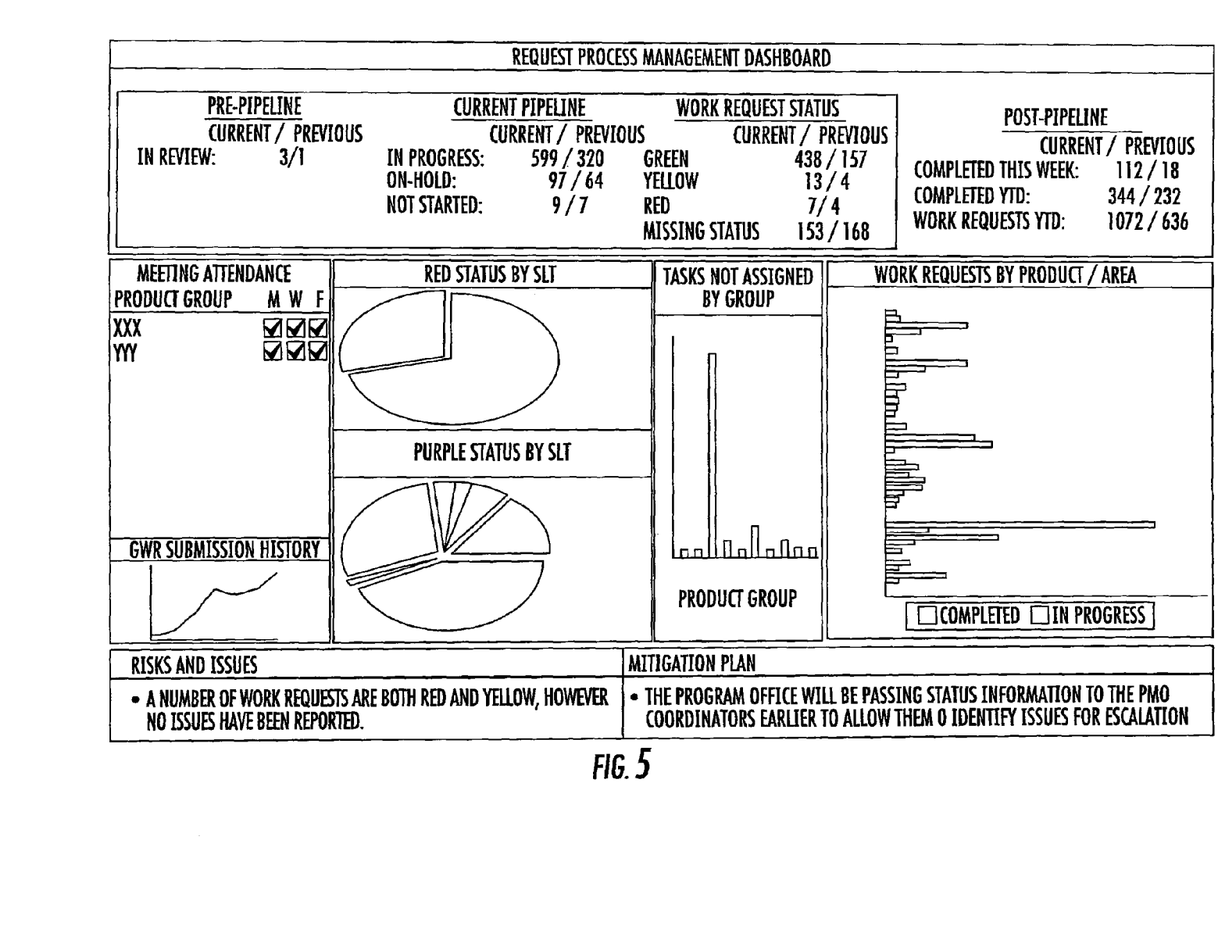
FIG. 5 is a diagram of a dashboard for request process management according to an example embodiment of the present invention.

FIG. 5 shows a diagram of a dashboard for request process management according to an example embodiment of the present invention. A dashboard may be generated to display a variety of types of information such as, for example, current status of one or more requests, one or more tasks being performed, status of requests being handled by one or more functional areas, status of requests being handled by different product groups, etc. The information displayed in a dashboard may be selected and customized. A dashboard may include information showing whether a request is in review, in progress, a current status, or whether it has been completed. Further, multiple requests and associated tasks may be accumulated and summary information on all requests and all tasks presented on the dashboard. The dashboard may also include other-types of information such as, for example, request submission histories, meeting attendance information, pre-pipeline, current pipeline, post-pipeline information, etc.

Various graphical images or mixed media may be used to illustrate the variety of information presented in the dashboard such as, for example, pie charts, graphs, bar charts, color codes, etc. to display the status of one or more requests and/or the processing of the requests. Information presented in the dashboard may be from data retrieved from a database, e.g., a SQL server database. Moreover, templates may be used to format the presented information for customizable dashboards. The dashboard may be customized by any of many different parameters. The information presented in the dashboard may be customized by a line of business, a functional area, a team, or a resource. The dashboard may also provide a tool for integrated demand management and capacity planning to handle active and forecasted projects, work and resource estimations, financial data reporting, resource planning, or project work estimation. The dashboard may further be configured to provide for hierarchical drill down of information regarding projects from a top level down to a resource level. The dashboard may be made accessible to sources of the requests such as customers and provide a customer-view of projects that provides transparency to the customer regarding status, timelines, or resources assigned regarding a specific request.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for service request and project request processing management within a business enterprise, the method comprising:
   receiving, at a communication device, service requests and project requests at a single entry point within the business entity, wherein each request is satisfied by completion of one or more tasks;
   identifying, via computing device processor, a task type for each of the one or more tasks in the request;
   determining, via a computing device processor, a task queue for each of the one or more tasks based on the identified task type;
   routing, via a computing device processor, each of the one or more tasks to the determined task queue;
   processing the tasks in accordance with the task queue; and
   generating, via a computing device processor, a task management dashboard that is configured to provide a requester, within a single view, status of the request and includes (1) status of all requests pre-pipeline, current pipeline, request in progress and post-pipeline, (2) a bar graph representation of a quantity of work requests that are completed and in progress for each of a plurality of product groups and (3) a bar graph representation of a quantity of tasks not assigned for each of a plurality of product groups.

2. The method of claim 1, wherein generating further comprises generating, via the computing device processor, the task management dashboard that is configured to include a first area indicating risks and issues related to work requests and a second area indicating mitigation plans related to work requests.

3. The method of claim 1, wherein generating further comprises generating, via the computing device processor, the task management dashboard that is configured to include a graphical representation of service request and project request submission history.

4. The method of claim 3, wherein generating further comprises generating, via the computing device processor, the task management dashboard that is configured to include a chart indicating meeting attendance data by product groups.

5. An apparatus for service request and project request processing management within a business enterprise, the apparatus comprising:

a computing platform including at least one processor and a memory in communication with the processor;

a task identifier and router stored in the memory, executable by the processor and configured to receive service requests and projects requests at a single entry point within the business entry, wherein each request is satisfied by completion of one or more tasks, identify a task type for each of the one or more tasks in the request, determine a task queue for each of the one or more tasks based on the identified task type, route each of the one or more tasks to the determined task queue, and process the tasks in accordance with the task queue; and a dashboard generation tool stored in the memory, executable by the processor and configured to provide a requester, within a single view, status of the request and includes (1) status of all requests pre-pipeline, current pipeline, request in progress and post-pipeline, (2) a bar graph representation of a quantity of work requests that are completed and in progress for each of a plurality of product groups, and (3) a bar graph representation of a quantity of tasks not assigned for each of a plurality of product groups.

6. The apparatus of claim 5, wherein the dashboard generation tool is further configured to include a first area indicating risks and issues related to work requests and a second area indicating mitigation plans related to work requests.

7. The apparatus of claim 5, wherein the dashboard generation tool is further configured to include a graphical representation of service request and project request submission history.

8. The apparatus of claim 7, wherein the dashboard generation tool is further configured to include a chart indicating meeting attendance data by product groups.

9. A computer program product comprising:
a non-transitory computer-readable medium comprising:
a first set of codes for causing a computer to receive service requests and project requests at a single entry point within a business entry, wherein each request is satisfied by completion of one or more tasks;

a second set of codes for causing a computer to identify a task type for each of the one or more tasks in the request;

a third set of codes for causing a computer to determine a task queue for each of the one or more tasks based on the identified task type;

a fourth set of codes for causing a computer to route each of the one or more tasks to the determined task queue, wherein the tasks are processed in accordance with the task queue; and a fifth set of codes for causing a computer to generate a task management dashboard that is configured to provide a requester, within a single view, status of the request and includes (1) status of all requests pre-pipeline, current pipeline, request in progress and post-pipeline status of all requests pre-pipeline, current pipeline, request in progress and post-pipeline, (2) a bar graph representation of a quantity of work requests that are completed and in progress for each of a plurality of product groups, and (3) a bar graph representation of a quantity of tasks not assigned for each of a plurality of product groups.

10. The computer program product of claim 9, wherein the fifth set of codes is further configured to cause the computer to generate the task management dashboard that is configured to include a first area indicating risks and issues related to work requests and a second are indicating mitigation plans related to work requests.

11. The computer program product of claim 9, wherein the fifth set of codes is further configured to cause the computer to generate the task management dashboard that is configured to include a graphical representation of service request and project request submission history.

* * * * *